United States Patent
Richardson et al.

(10) Patent No.: US 10,929,381 B2
(45) Date of Patent: Feb. 23, 2021

(54) BULK VALIDATION OF SPATIAL TOPOLOGY DATA

(71) Applicant: Ordnance Survey Limited, Southampton (GB)

(72) Inventors: Mark Richardson, Southampton (GB); Jonathan Holmes, Southampton (GB); Michael Dunn, Southampton (GB)

(73) Assignee: Ordnance Survey Limited, Southampton (GB)

( * ) Notice: Subject to any disclaimer, the term of this patent is extended or adjusted under 35 U.S.C. 154(b) by 611 days.

(21) Appl. No.: 15/664,483

(22) Filed: Jul. 31, 2017

(65) Prior Publication Data
US 2018/0060380 A1 Mar. 1, 2018

(30) Foreign Application Priority Data
Aug. 31, 2016 (EP) .................................. 16186706

(51) Int. Cl.
*G06F 16/00* (2019.01)
*G06F 16/23* (2019.01)
(Continued)

(52) U.S. Cl.
CPC ........ *G06F 16/2365* (2019.01); *G06F 16/215* (2019.01); *G06F 16/2237* (2019.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 7,890,509 B1 * | 2/2011 | Pearcy | ................... | G06Q 10/06 707/736 |
| 8,078,594 B1 * | 12/2011 | Pearcy | ................... | G06Q 10/06 707/692 |

(Continued)

FOREIGN PATENT DOCUMENTS

| | | |
|---|---|---|
| GB | 2416222 A | 1/2006 |
| GB | 2517932 A | 3/2015 |

OTHER PUBLICATIONS

Migliorini, Sara, Alberto Belussi, Mauro Negri, and Giuseppe Pelagatti. "Towards massive spatial data validation with SpatialHadoop." In Proceedings of the 5th ACM SIGSPATIAL International Workshop on Analytics for Big Geospatial Data, pp. 18-27. 2016. (Year: 2016).*

(Continued)

*Primary Examiner* — Farhan M Syed
(74) *Attorney, Agent, or Firm* — Banner & Witcoff, Ltd.

(57) ABSTRACT

Aspects described herein are concerned with automatically validating spatial features of a spatial dataset. One solution is built upon a database server which performs a decomposition of the features' geometries into line segments, after which, sets of line segments are compared to detect errors in the dataset. The decomposition of features geometries into line segments results in a reduction of processing time with a simultaneous increase of precision. The method not only generates new intermediate database structures for detection of topological errors but is also complemented by a clearance process that can lead to the automatic repair of topological errors. The clearance process identifies topological errors and provides modifications to the previously identified line segments such that a modified set of line segments overcomes the conditions that led to the error state. The changes to the data set can be applied automatically after (Continued)

displaying them as an overlay for a predefined amount of time.

18 Claims, 8 Drawing Sheets

(51) Int. Cl.
*G06F 16/27* (2019.01)
*G06F 16/29* (2019.01)
*G06F 16/22* (2019.01)
*G06F 16/215* (2019.01)
*G06F 16/56* (2019.01)

(52) U.S. Cl.
CPC .......... *G06F 16/2386* (2019.01); *G06F 16/27* (2019.01); *G06F 16/29* (2019.01); *G06F 16/56* (2019.01)

(56) References Cited

U.S. PATENT DOCUMENTS

| | | | |
|---|---|---|---|
| 9,542,416 B2* | 1/2017 | Watson | ............... G06F 16/2365 |
| 2007/0130172 A1 | 6/2007 | Lee | |
| 2012/0066187 A1* | 3/2012 | Pearcy | .................. G06Q 10/06 707/692 |
| 2016/0124993 A1* | 5/2016 | Watson | ................... G06F 16/29 707/690 |
| 2017/0075948 A1* | 3/2017 | Watson | ................... G06F 16/16 |
| 2017/0293676 A1* | 10/2017 | Lowe | ..................... G06F 16/93 |

OTHER PUBLICATIONS

Fonseca, Manuel J., Alfredo Ferreira, and Joaquinn A. Jorge. "Sketch-based retrieval of complex drawings using hierarchical topology and geometry." Computer-Aided Design 41, No. 12 (2009): 1067-1081. (Year: 2009).*

Fonseca, Manuel J., and Joaquim A. Jorge. "Towards content-based retrieval of technical drawings through high-dimensional indexing." Computers & Graphics 27, No. 1 (2003): 61-69. (Year: 2003).*

Feb. 20, 2017—(EP) Extended Search Report—App No. 16186706.4.

* cited by examiner

BULK VALIDATION OF SPATIAL TOPOLOGY DATA

CROSS-REFERENCE TO RELATED CASES

This application claims priority to EP Patent Application No. 16186706.4 filed Aug. 31, 2016, to applicant Ordnance Survey Limited, and by inventors Richardson, Holmes, and Dunn.

TECHNICAL FIELD

Aspects described herein relate to computer implemented methods and systems for validating spatial topologies in large spatial datasets.

BACKGROUND

Most providers of digital maps rely on a very detailed topographical map database which stores the underlying data. For example, Ordnance Survey uses the very large scale topographic product OS MasterMap®, which records every feature larger than a few metres in one continuous dataset, and is constantly being updated.

A topographic feature is an abstraction of a real-world object. It is not the real-world object itself. For instance, the OS MasterMap® product is composed of discrete vector features, each of which has a feature type, geometry, and various feature attributes. More details about this product can be found in the manual *OS MasterMap® Topography layer—User guide and technical specification*, v1.12-03/2014.

The Topography Layer of the map database contains not only physically-apparent real-world objects, but also topographic concepts, such as inferred area feature boundaries. The four following types of feature are of interest in the context of the present application and are used to represent geospatial information in the Topography Layer; they are:

Point Features
   Topographic point features and spot heights.
Line Features
   Topographic line features, such as walls, fences, kerbs, etc. and inferred topographic area boundaries such as polygon closing links.
Polygon Features
   Topographic area features, such as buildings, gardens, pavements, areas of surface water etc.

A point feature represents a real-world object. The geometry of a point feature is a single point (a pair of coordinates) with optional size and orientation.

A line feature is generally an abstraction of a linear object such as a wall or riverbank. The geometry of a line feature is a polyline—an ordered string of points. A particular line feature will often represent only part of an object. For example, a line feature may represent a linear entity (for example, part or all of a fence), the boundary of an area (for example, a house) or both (for example, a fence around a field).

A polygon feature is a polygonised representation of a real-world object having an area. A polygon feature may be used to represent a building, field, lake, and so on. Each area bounded by a continuous closed chain of line features is an area feature. An area geometry is composed of a single outer ring and any number of inner rings. If an area feature's geometry has an inner ring, the region of space which the geometry surrounds but does not occupy will be occupied by one or more further polygon features. For example, a garden may be one feature and a detached house might be another. The geometry of the garden might have an inner ring which surrounds the house. Each boundary is a collection of rings (i.e line geometries which start and end at the same point.

A structuring layer contains features that do not cut across each other and are permitted to connect to each other spatially, sharing common geometry at their edges. For example, most topographic features participate in a single topological structuring layer. During capture and maintenance of the data, processes ensure that vertices of the geometry of features are coincident where they should be, so that the features topologically structure with each other.

The map datasets are generally created from a single master dataset, which is updated regularly. The map data is updated by surveyors who cover different areas and for different reasons. There are various reasons why errors might appear in a database; often due to a bug in a software process acting upon it. Some aspects described herein identify such errors at a topological level.

Topology layers often contain a small number of overlapping polygons and boles' which no polygon's geometry covers. Such problems must be removed, and at present locating such errors through validating a very large dataset is a time-consuming process.

In the following, the term "features" is used to mean features which participate in a topology, unless otherwise specified.

For features in a spatial dataset, there is often an expected way in which their geometries should relate to each other. Linear features might be expected to define the boundary of an area feature exactly for instance, or decision node features on a routing network might be expected to appear only at the end positions on linear link features. These are all types of topological relationships and ensuring that data satisfies these conditions is the problem of validating spatial topology.

Topological errors can occur for example with polygons (e.g. overlapping polygons, or spaces between adjacent polygon borders) or with (poly-) lines (e.g. the features do not perfectly meet at a point). Errors on the level of topographic features therefore break the relationship with map features. However, the detection of topological errors in the spatial topology can be very time consuming because data integrity rules have to be validated for each map feature.

Existing approaches for detecting topological errors are feature-based and perform spatial searches around the geometry of individual features, to test for adjacent features, and then test that the geometries of the feature being checked are compatible with those of the adjacent features. This is done in one of two ways. The process can be run in the database, and feature is visited and a spatial query is performed to find other features which intersect its geometry. The geometries of the features found are compared to each other to test whether they satisfy the relevant topology rules. Alternatively, the process runs in an application outside the database. The application queries the database to extract spatial regions to be validated. Typically, each region is a square grid cell. The grid cells might vary in size (where the data is more or less dense). Each regions is validated independently in the application. The whole dataset is validated in this way.

Repeated spatial queries for the topological features within a large dataset mean that these methods can be very slow, in the case of a dataset such as a topographic map database which has hundreds of millions of features.

The spatial searches have to be performed for every topological feature in the dataset and hence many topological features are subject to several validation tests due to the repeated adjacency analysis. Normally they are not considered to interact with other features in the topography structuring layer. Aspects described herein are only concerned with the problem of validating spatial topology in two dimensions.

SUMMARY

Aspects described herein are concerned with automatically validating spatial features of a spatial dataset. The solution is built upon a database server which performs a decomposition of feature geometries into line segments which are then used for coordinate vector tests. The decomposition of complex geometries into line segments (i.e. simple vectors) results in a reduction of processing time and complexity with a simultaneous increase of precision, since no tolerances are required to decide whether slightly different geometries should be considered to match one another. The inventive method not only generates new intermediate database structures for topological testing but may also be complemented by clearance process that can lead to the automatic repair of topological errors. The clearance process identifies topological errors and provides modifications to the previously identified line segments such that a modified set of line segments overcomes the conditions that led to the error state. The modifications can be displayed as a graphical overlay above the region of the topological error. The changes to the data set can be applied automatically after displaying them as an overlay for a predefined amount of time. Hence, typical topological errors can be corrected automatically while allowing an operator to intervene in the case that manual input is required.

According to a first aspect, there is provided a computer implemented method for automatically validating a spatial topology dataset comprising a plurality of topological features each having a geometry, comprising decomposing the geometries of the features within the spatial topology dataset into individual coordinate vectors; populating a first index in a first database structure with the individual coordinate vectors, and performing validation queries on the first database structure in order to locate topological errors in the dataset.

The method may further comprise populating a further database structure with the located topological errors.

Performing the validation queries may include performing a set difference query on the database structure.

The method may further comprise: populating a second index in the database structure with the individual coordinate vectors in inverted form, and the set difference query may be performed on both the first index and the second index.

The first database structure may be populated with individual line vectors from decomposed area features, and the method may further comprise populating a second database structure with individual line vectors from decomposed line features, and performing the validation queries may further comprise comparing the contents of the first database structure with that of the second database structure to locate topological errors.

The method may further comprise: dynamically updating the coordinate vectors and vector indices in the relevant data structure in response to an update of a collection of source features, and dynamically performing the validation queries in response to an update of a collection of source features.

The method may further comprise: identifying the coordinate vectors which are edges of the spatial topology dataset, and where an edge vector is present in the data structure comprising the located topological errors, removing the edge vector from said data structure after performing the validation queries.

The method may further comprise: automatically determining a clearance of the topological error for all entries in the further database structure by graphically displaying an arrangement of one or more line coordinate vectors that produced the topological error. The modified arrangement may be created based upon a predetermined rule set. The rule set may include applying one or more weighting coefficients to one or more possible solutions, and the best solution is be displayed.

The user is presented with a display showing the line vectors which have produced the error, and thus the validation and error clearance may be overseen by the user, without the user having to intervene in the automatic process.

According to a second aspect, there is provided a networked computer system, and comprising: a database server, one or more of a survey server, an update server, a plurality of mobile survey and/or update devices, a distributed database system, a network connecting the database system to the server(s) and mobile devices, arranged to perform a method for automatically validating a spatial topology dataset comprising a plurality of topological features each having a geometry, comprising decomposing geometries of the features within the spatial topology dataset into individual coordinate vectors; populating a first index in a first database structure with the individual coordinate vectors, and performing validation queries on the first database structure in order to locate topological errors in the dataset, the networked computer system.

According to a third aspect there is provided a computer program storage medium comprising instructions, that when loaded into the memory of a computer system comprising a database server, one or more of a survey server, an update server, a plurality of mobile survey and/or update devices, a distributed database system, a network connecting the database system to the server(s) and mobile devices, cause the system to execute a method for automatically validating a spatial topology dataset comprising a plurality of topological features each having a geometry, comprising decomposing geometries of the features within the spatial topology dataset into individual coordinate vectors; populating a first index in a first database structure with the individual coordinate vectors, and performing validation queries on the first database structure in order to locate topological errors in the dataset.

Further features and advantages of aspects described herein will be apparent from the appended claims.

BRIEF DESCRIPTION OF THE DRAWINGS

Further features and advantages will become apparent from the following description of an embodiment thereof, presented by way of example only, and by reference to the drawings, wherein like reference numerals refer to like parts, and wherein:

FIG. 3a shows a simplified topology;

FIG. 3b shows a table demonstrating line vectors decomposed from the topology of FIG. 3a;

DESCRIPTION OF THE EMBODIMENTS

Figure 1A:
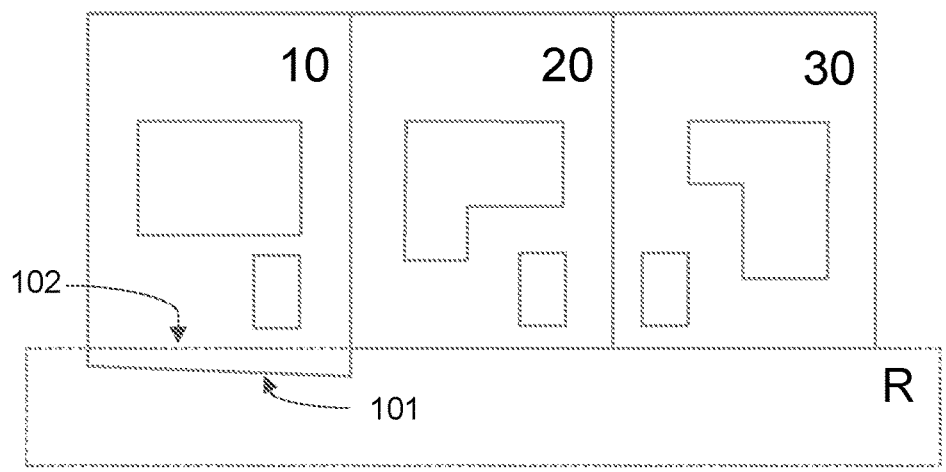
FIGS. 1a-1c show examples of topological errors in the topographic layer of a spatial feature dataset.
Figure 1B:
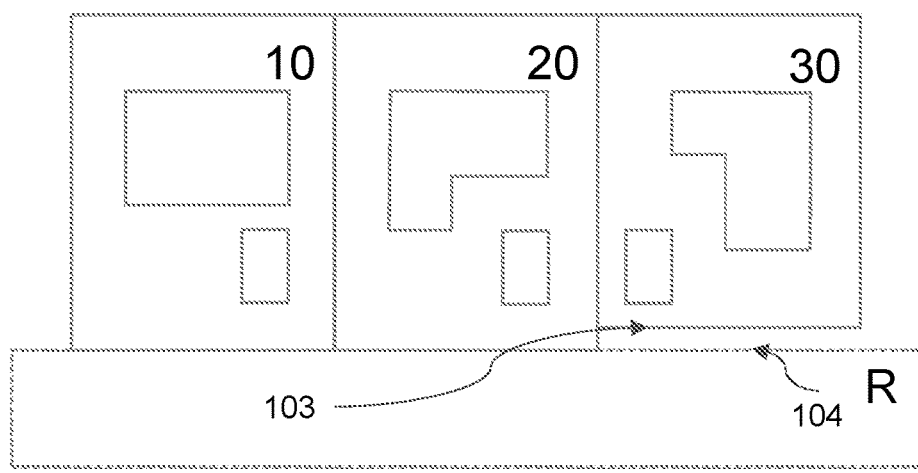
Figure 1C:
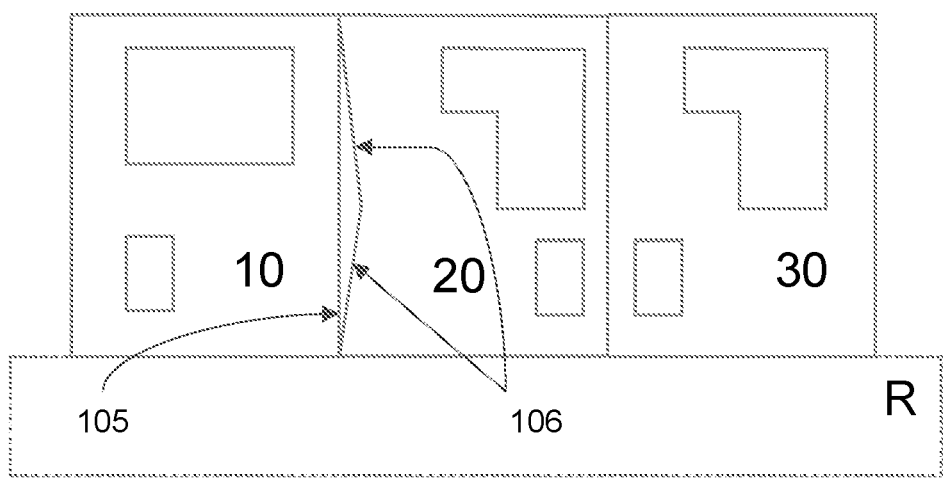

FIGS. 1a-1c exemplify typical topological errors that can be encountered in the context of a simplified topological data set.

FIG. 1a shows a road segment with three plots 10, 20, 30, each with a large building (house) and a small building (garage). The plot to the left of FIG. 1a has an overlap with the road where the southern boundary 10, 101 of the plot is neither parallel nor adjacent to the edge of the road segment 102. A topological error of this type will lead to errors in the validation of the database. In the systems of the prior art, this error will occur in the processing of the boundary line of the property and also in the line feature denoting the edge of the road R. This processing requires a spatial proximity search for each feature to determine whether a nearby feature contains a boundary which could be adjacent. The error can be detected and removed in a fully automated manner with aspects described herein as will be explained in more detail below.

FIG. 1b shows a similar road segment with three plots 16, 20, 30 and two buildings per plot. The right plot 70 is not adjacent to the road and does thus not share a common border with the road. The result is a gap between the two area features between the lower boundary 103 of the plot 70 and the upper part 104 of the road R. Again, this is a topological error and requires rectification.

FIG. 1c shows an example of a spurious feature between the right hand border 105 of plot 101 and the left hand border 106 of plot 20 which results in an undefined area between the two plots. The resulting hole in the dataset requires rectification.

Detection of Topological Errors

Figure 2:
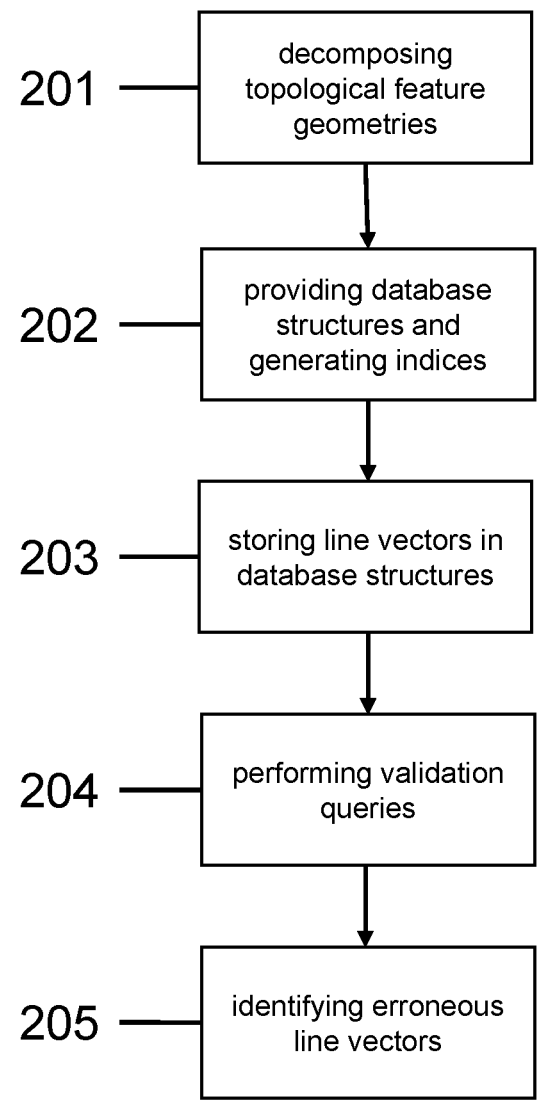
FIG. 2 contains a flow diagram of the inventive validation process.

FIG. 2 shows a high-level summary of the detection process of topological errors within a spatial feature dataset.

Aspects described herein solve the topology validation problem by performing queries on a set, or a number of sets, of line segments. This, in contrast to known systems which use the whole geometry of each feature as the basis for a search for possible errors.

The geometries of features from the dataset are made up of line segments. The geometry of each feature that is represented in the spatial feature data set is decomposed into single line vectors in step 201. The decomposition of area features' geometries (which have an outer ring and may also comprise one or more inner rings, as described above) are oriented consistently throughout the dataset. The dataset used by the applicant uses the convention that the outer rings of area geometries are oriented anti-clockwise, and inner rings are oriented clockwise; that is to say that the area is always on the left when following the ring in the direction in which it is ordered.

The decomposition of each line or area geometry results in a series of line vectors. The line segments can be represented as coordinate vectors, i.e. 4-tuples representing the coordinate points of the start and end points.

Database structures are created in step 202 which can be populated with the 4-tuple vectors decomposed from the topological features in step 203. The database structures take the form of simple tables. There is one table for each type of feature that participates in a topology which is to be validated (e.g. a table for line segments from the geometries of Topographic Area features, another for Topographic Line features).

Once the data structures have been populated with the line vectors, the validation queries are performed at step 204.

Validation queries are run which identify the line vectors that do not have a corresponding vector present in the database structure which is from a different feature. These vectors indicate errors in the topological dataset. In the case of area features, a query is run to find corresponding vectors having the opposite orientation, and an error is determined where none exists. Equally, if an area segment exists which has a corresponding vector in the same orientation, from another area geometry, this indicates the existence of overlapping areas, and is an error.

Further validation queries might include verifying the intersection of segments. Segments should only intersect at their ends. The existence of an intersection between an end point of a segment and an interior point of a segment indicates an error, as does the intersection of the interior points of two segments.

The identification of these erroneous vectors in step 2015 may include the further step of populating a further database structure with the identified vectors.

Figures 3A, 3B:
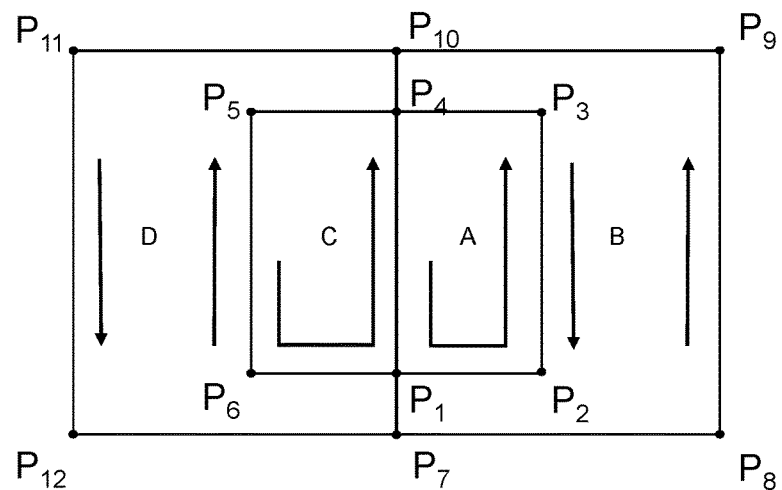

FIG. 3a shows an example topology of a plot containing a semi-detached property and gardens. Feature A is a property bordered on three sides by area B, for example a garden, and bordered by feature C on the fourth side. Feature C is the other half of the semi-detached property, and is bordered by area D, a further garden.

Feature A is the polygon defined by points $P_1$, $P_2$, $P_3$, $P_4$. Feature B is the polygon defined by points $P_7$, $P_8$, $P_9$, $P_{10}$, $P_4$, $P_3$, $P_2$, $P_1$. Feature C is the polygon defined by points $P_6$, $P_1$, $P_4$, $P_5$. Feature D is the polygon defined by points $P_{12}$, $P_7$, $P_1$, $P_6$, $P_5$, $P_4$, $P_{10}$, $P_{11}$.

Area features such as A, B, C and D are deconstructed by tracing the feature from an arbitrary point and following the boundary of the polygon in an anti-clockwise direction.

FIG. 3b shows a representation of the line segments which result from the decomposition of the area features. The geometry of area feature A is broken into the line segments $P_1P_2$; $P_2P_3$; $P_3P_4$; and $P_4P_1$. The geometry of area feature B has been decomposed into the line segments $P_7P_8$; $P_8P_9$; $P_9P_{10}$; $P_{10}P_4$; $P_4P_3$; $P_3P_2$; $P_2P_1$; and $P_1P_7$. In the case of decomposed area features, the validation that no errors exist in the topology is straightforward once the steps of decomposing the geometry into line vectors and populating a database structure with the line vectors have been realised. In the context of area features, the only operation which is required is to check for the existence of each vector elsewhere in the data structure with its opposite orientation. In the case of the highly simplified scenario shown in FIG. 3a and FIG. 3b it can be seen that all of the vectors which make up area A have their corresponding vectors decomposed from other area features. For example, $P_1P_2$ from area A is clearly present in inverse form as $P_2P_1$ from feature B, as shown in FIG. 3b.

Six of the line vectors from FIG. 3a and present in the table in FIG. 3b have no corresponding vector present from another feature, since they represent the edges of the topology. These edge vectors must be removed from the errors identified. The most efficient way to do this is to identify the edge vectors, which in a large topological data set may include coastline, and to use them to populate a further data structure. After the bulk validation of the main data structure, which contains the line vectors which have been decomposed from the area features, it can be trimmed of the edge vectors by performing, for example, a separate set difference query. In this way, the difference does not have to run on the main data structure and thereby lead to erroneous errors which are the result of not finding a match for an edge vector.

In the example topology in FIG. 3a, no errors are present. The table shown in FIG. 3b is for illustration purposes and does not represent the actual form of the data structures used to carry out aspects described herein.

When checking the boundaries of area features correspondence to line features, checking for segments in either orientation is done.

As stated above the only query that needs to be performed is a test for the existence of a particular known coordinate vector. This might be with its forwards (from start to end) or reversed (from end to start) orientation. An aspect described hereintherefore has two indexes on the table, both of which include all four columns. The first index keeps the columns in their natural order, the second inverts the first and last pairs of columns (start and end points). The set difference query is performed both on the first index and the second index to determine the erroneous vectors.

A topology validation test thus uses database queries, such as SQL set differencing operations that can efficiently locate any errors.

Also, because the geometries are represented using a fixed numerical precision, the issues that are associated with using tolerances with spatial searches are overcome. The database queries that are performed on the sets of line segments always have exact yes/no results, as they are tested for segments exactly matching each other, or each other's inverse.

The tables are initially populated with all the individual line segments from all the geometries of all features of the relevant type. In a further embodiment, the tables are dynamically updated as the source features are changed. A system arranged to carry out the method can therefore dynamically perform the validation process on the dataset as updates are made.

Note that this approach to validation will work, even if the interpolation used between data points is not linear. For example, the interpolation scheme might use circular arcs. The line segments are a way of expressing the ordering of data points within a geometry. A single segment is a way of expressing that a given point follows a different point. If the same data points appear in the same order and the same interpolation scheme is used, then the geometry is the same.

It is possible to mix interpolation schemes, even within a single geometry. This validation technique can still be used if this is done, as long as the vectors derived from sections of geometry which use different interpolation schemes can be distinguished in some way. This might be done by having separate line segment tables for the different types of interpolation, or by adding an attribute to the line segments to indicate the type of interpolation.

Illustrative Example

In the preferred example, a large dataset must be exactly covered by tessellating Topographic Area features (i.e. the boundaries of adjacent features must match exactly, with no gaps or overlaps). A single data structure table is created, which contains all line segments from the boundaries of all (often hundreds of millions) of the topographic area features in the dataset. There is then a condition that, for every segment, the inverse segment must also exist and must not be from the same source feature. This can be checked via database queries, which in the present case are set-difference SQL queries.

Two example SQL queries are included here, with comments included in-line.

- ■ [1.1] Look for line segments from a topographic area boundary where there is no corresponding reversed segment
  - ■ from a topographic area's boundary.
- SELECT          TALS1.FID,
  1. TALS1.START_EASTING,
  2. TALS1.START_NORTHING,
  3. TALS1.END_EASTING,
  4. TALS1.END_NORTHING
- FROM            STG.TOPOGRAPHY_AREA_LINESEGMENT TALS1
- WHERE           (TALS1.START_EASTING, TALS1.START_NORTHING, TALS1.END_EASTING, TALS1.END_NORTHING) NOT IN
  1. (
     a. SELECT        TALS2.END_EASTING,
        1. TALS2.END_NORTHING,
        2. TALS2.START_EASTING,
        3. TALS2.START_NORTHING
     b. FROM          STG.TOPOGRAPHY_AREA_LINESEGMENT TALS2
  2. )
  3. AND
- --
  - ■ Exclude the dataset edge.
    1. (TALS1.START_EASTING, TALS1.START_NORTHING, TALS1.END_EASTING, TALS1.END_NORTHING) NOT IN
    2. (
       a. SELECT        EODLS1.START_EASTING,
          1. EODLS1.START_NORTHING,
          2. EODLS1.END_EASTING,
          3. EODLS1.END_NORTHING
       b. FROM          STG.EDGE_OF_DATASET_LINESEGMENT EODLS1

-continued

```
        3.  )
        4.  AND
        5.  (TALS1.START_EASTING; TALS1.START_NORTHING,
            TALS1.END_EASTING, TALS1.END_NORTHING) NOT IN
        6.  (
                a.  SELECT      EODLS2.END_EASTING,
                            1.  EODLS2.END_NORTHING,
                            2.  EODLS2.START_EASTING,
                            3.  EODLS2.START_NORTHING
                b.  FROM        STG.EDGE_OF_DATASET_LINESEGMENT
                    EODLS2
        7.  );
```
- ■ [1.6] Look for line segments from a topographic area boundary where there is no corresponding segment
- ■ (same direction or reversed) from a topographic line.
```
• SELECT      TALS.FID,
          1.  TALS.START_EASTING,
          2.  TALS.START_NORTHING,
          3.  TALS.END_EASTING,
          4.  TALS.END_NORTHING
• FROM        STG.TOPOGRAPHY_AREA_LINESEGMENT TALS
• WHERE       (TALS.START_EASTING, TALS.START_NORTHING,
    TALS.END_EASTING, TALS.END_NORTHING) NOT IN
          1.  (
                a.  SELECT      TLLS1.START_EASTING,
                            1.  TLLS1.START_NORTHING,
                            2.  TLLS1.END_EASTING,
                            3.  TLLS1.END_NORTHING
                b.  FROM        STG.TOPOGRAPHY_LINE_LINESEGMENT
                    TLLS1
          2.  )
          3.  AND
          4.  (TALS.START_EASTING, TALS.START_NORTHING,
              TALS.END_EASTING, TALS.END_NORTHING) NOT IN
          5.  (
                a.  SELECT      TLLS2.END_EASTING,
                            1.  TLLS2.END_NORTHING,
                            2.  TLLS2.START_EASTING,
                            3.  TLLS2.START_NORTHING
                b.  FROM        STG.TOPOGRAPHY_LINE_LINESEGMENT
                    TLLS2
          6.  );
```

The table definitions are:

```
•   CREATE TABLE STG.TOPOGRAPHY_LINE_LINESEGMENT
•   (
        ■ FID              VARCHAR2(38)    NOT NULL    REFERENCES
          STG.TLF_STG(FID),
        ■ START_EASTING    NUMBER(9, 3)    NOT NULL,
        ■ START_NORTHING   NUMBER(10, 3)   NOT NULL,
        ■ END_EASTING      NUMBER(9, 3)    NOT NULL,
        ■ END_NORTHING     NUMBER(10, 3)   NOT NULL
•   );
•   CREATE TABLE STG.TOPOGRAPHY_AREA_LINESEGMENT
•   (
        ■ FID              VARCHAR2(38)    NOT NULL    REFERENCES
          STG.TAF_STG(FID),
        ■ START_EASTING    NUMBER(9, 3)    NOT NULL,
        ■ START_NORTHING   NUMBER(10, 3)   NOT NULL,
        ■ END_EASTING      NUMBER(9, 3)    NOT NULL,
        ■ END_NORTHING     NUMBER(10, 3)   NOT NULL
•   );
•   CREATE TABLE STG.EDGE_OF_DATASET_LINESEGMENT
•   (
        ■ FID              VARCHAR2(38)    NOT NULL    REFERENCES
          STG.TLF_STG(FID),
        ■ START_EASTING    NUMBER(9, 3)    NOT NULL,
        ■ START_NORTHING   NUMBER(10, 3)   NOT NULL,
        ■ END_EASTING      NUMBER(9, 3)    NOT NULL,
        ■ END_NORTHING     NUMBER(10,3)    NOT NULL
•   );
```

And we have indexes on all four ordinates. We have an index where the segments are oriented forwards and a separate index where they are reversed.

- CREATE INDEX STG.TLINE_LINESEG_FWDS_IDX ON
  STG.TOPOGRAPHY_LINE_LINESEGMENT(START_EASTING, START_NORTHING,
  END_EASTING, END_NORTHING);
- CREATE INDEX STG.TLINE_LINESEG_RVRS_IDX ON
  STG.TOPOGRAPHY_LINE_LINESEGMENT(END_EASTING, END_NORTHING,
  START_EASTING, START_NORTHING);
- CREATE INDEX STG.TAREA_LINESEG_FWDS_IDX ON
  STG.TOPOGRAPHY_AREA_LINESEGMENT(START_EASTING, START_NORTH-
  ING,
  END_EASTING, END_NORTHING);
- CREATE INDEX STG.TAREA_LINESEG_RVRS_IDX ON
  STG.TOPOGRAPHY_AREA_LINESEGMENT(END_EASTING, END_NORTHING,
  START_EASTING, START_NORTHING);
- CREATE INDEX STG.EDSET_LINESEG_FWDS_IDX ON
  STG.EDGE_OF_DATASET_LINESEGMENT(START_EASTING, START_NORTHING,
  END_EASTING, END_NORTHING);
- CREATE INDEX STG.EDSET_LINESEG_RVRS_IDX ON
  STG.EDGE_OF_DATASET_LINESEGMENT(END_EASTING, END_NORTHING,
  START_EASTING, START_NORTHING)

Further constraints caused by the nature of topological datasets exist. For example, the dataset as a whole often has an 'edge', but this can be excluded where necessary by representing the dataset edge as another set of line segments (another table) to be removed from the apparent errors relating to gaps between topographic area features. When running the verification process relating to area features one condition is that there must not be gaps between the geometries of Topographic Area features, and this does not hold true at the edge of the dataset. Therefore the identified edge vectors can be removed from the errors identified in order to satisfy this condition.

Likewise, the boundary of every Topographic Area feature must match the geometries of a number of Topographic Line features surrounding it. Line segments from Topographic Areas and Topographic Lines exist in two separate database structures. The validation test is therefore performed in that every segment from the boundary of a Topographic Area feature is also either a segment from a Topographic Line feature, or its inverse.

Correction of Topological Errors

One or more aspects described herein are not limited to the detection of topological errors but may also cover the automatic topological error detection and clearance such that the dataset is automatically cleared from erroneous line segments and hence topological features.

Figure 4A:
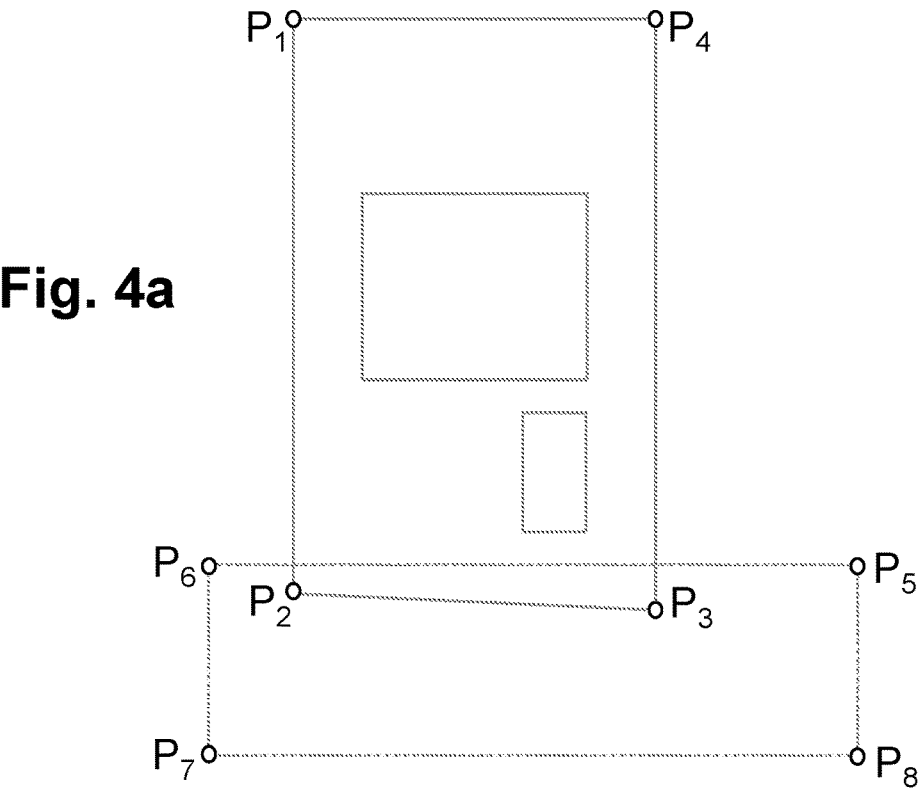
FIGS. 4a-4c show a process of the detection and clearance of topological errors.

FIG. 4a shows an enlarged and partial view of the topological error from FIG. 1a. The plot feature is defined by the four line segments $P_1P_2$, $P_2P_3$, $P_6P_4$ and $P_4P_1$. The road feature on FIG. 4a is described by line segments $P_5P_6$, $P_6P_7$, $P_7P_8$ and $P_8P_5$. For simplification purposes, the start and end points of the line segments defining the buildings are not shown here. It is noted that every point ($P_1$, $P_2$, etc.) is defined by a pair of coordinates. Hence, every line segment is defined by two pairs of coordinates.

Some line segments in FIG. 4a intersect ($P_1P_2$ with $P_5P_6$ and $P_3P_4$ with $P_5P_6$) and therefore new intersection points $P_9$ and $P_{10}$ are introduced in the dataset.

Figure 4B:
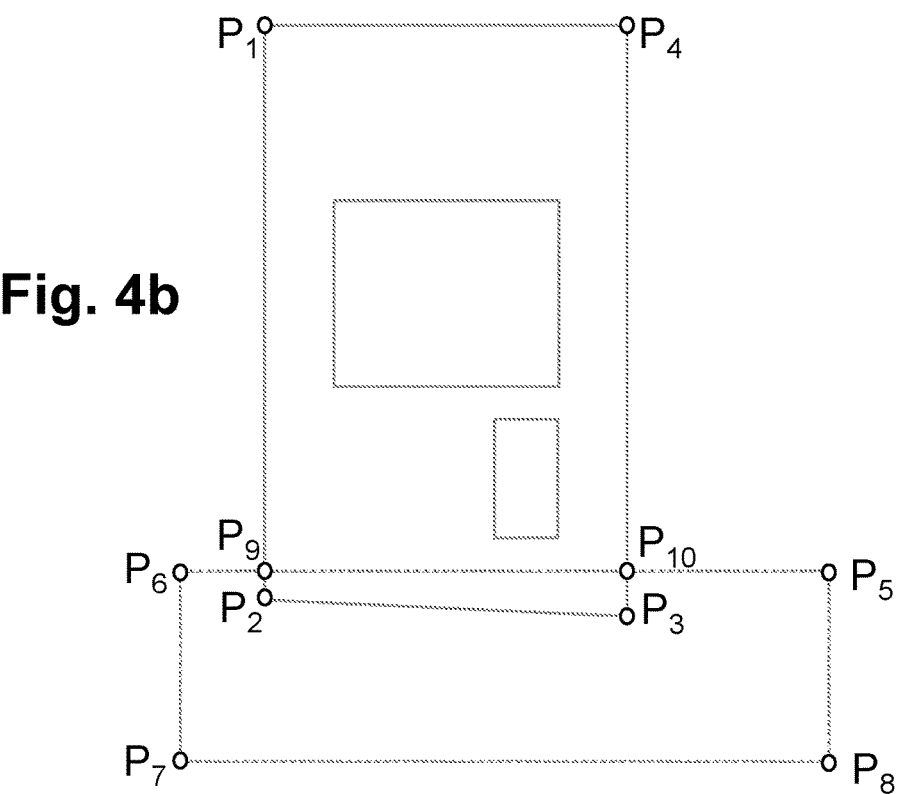

FIG. 4b shows the property and road features after introduction of the new points. The plot feature now consists of the following six line segments: $P_1P_9$, $P_9P_2$, $P_2P_3$, $P_3P_{10}$, $P_{10}P_4$ and $P_4P_1$. Similarly, the road segment now consists of the following six line segments: $P_5P_{10}$, $P_{10}P_9$, $P_9P_6$, $P_6P_7$, $P_7P_8$ and $P_8P_1$.

The line segments are represented as coordinate vectors, i.e. 4-tuples in a database structure having four numeric columns, and since there is therefore a single table containing all line segments from the boundaries of all topographic area features in the dataset, there is then simply a condition that, for every segment, the inverse segment must also exist and must not be from the same source feature.

In the context of FIG. 4b this leads to the identification of line segments $P_9P_2$, $P_2P_3$, $P_3P_{10}$ and $P_{10}P_9$, for which the inverse segment does not exist. These line features do thus not fulfil the conditions set up above and are added to the set of erroneous line segments. The edges of the limited data set shown in FIG. 4 which are defined by the segments $P_6P_7$, $P_7P_8$, $P_8P_5$, $P_5P_{10}$, $P_{10}P_4$, $P_4P_1$, $P_1P_9$, $P_9P_6$, are removed from the dataset, so they are not presented as errors when the validation queries are performed.

Figure 4C:
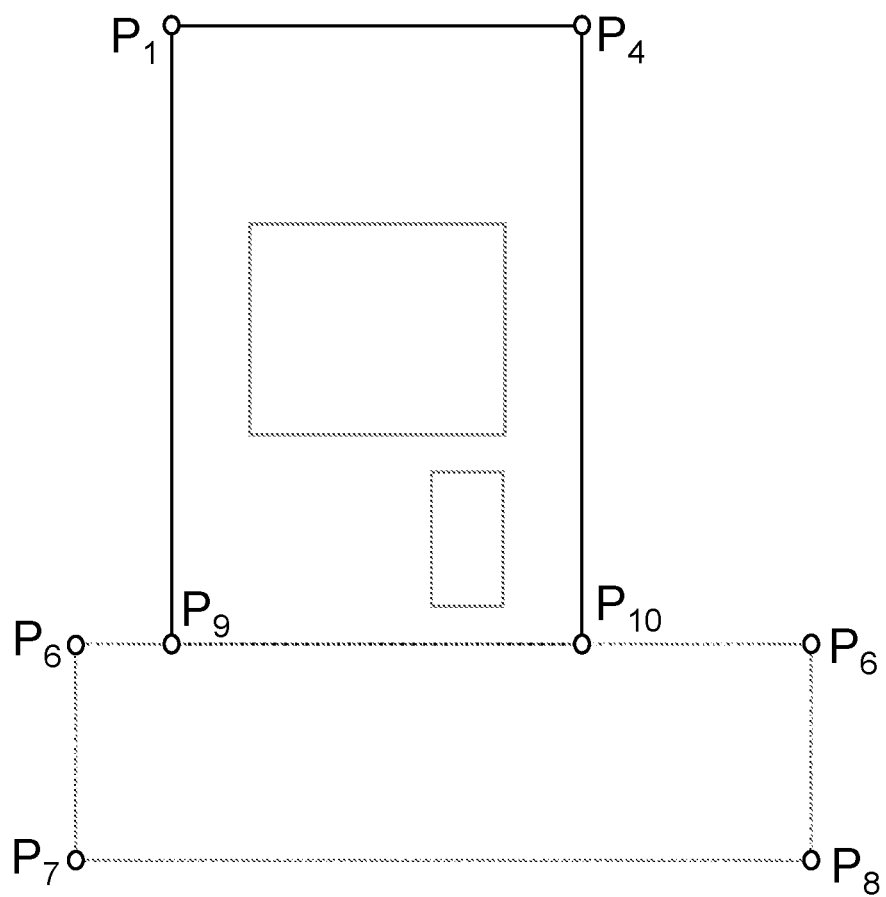

FIG. 4c shows the corrected spatial topology. The user can locate the errors that have been identified and use a standard editing client to perform manual editing. Alternatively, the inventive method can present the user with a plurality of solutions based on previously confirmed corrections (e.g. reducing the overlap region to zero) and display the proposed solution(s) as an overlay above the erroneous spatial topology.

It is noted that a solution is only proposed if it fulfils the above defined conditions, i.e., that for every segment, the inverse segment also exists and is not from the same source feature. The display of the alternative solutions can be linked to a countdown-timer (e.g. 10 seconds) after which the proposed solution is automatically registered in the dataset. Hence, the inventive method does not only detect topological errors in datasets but also provides for clearance of the detected errors in a fully automated manner.

Figure 5:
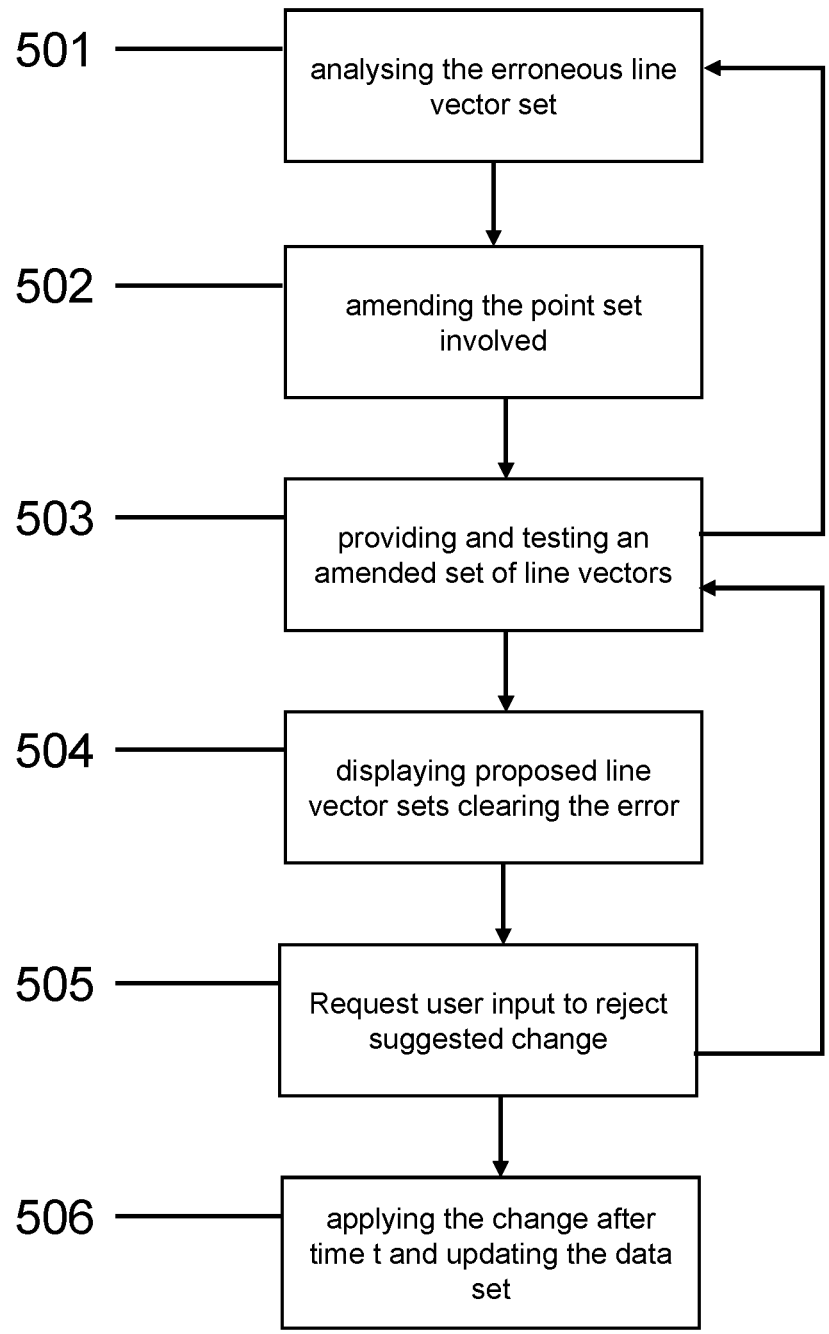
FIG. 5 contains a flow diagram of the inventive topology error clearance process.

FIG. 5 shows a high-level summary of the automated error clearance process for eliminating topological errors. Clearance of the topological error for all entries in the error database structure is automatically determined, with the solutions to be applied presented graphically to a user, who may intervene to override the automatically generated solution.

In step 501 the analysis of the database structure containing the erroneous vectors is performed. The system performs an analysis of the most likely solution to the error, based on a predetermined rule set. For example, in the simplified topology shown in FIG. 4a-4c, a test for the continuity of the edge of an area feature around the error line vectors could be performed. It is clear that the extended area of the "garden" area feature projects into the road, and therefore based on an assumption that a road feature will have a substantially linear edge, an amended line segment set can be generated (step 502), as shown in FIG. 4c. The set of assumptions can be generated prior to performing the analysis, based on a set of scenarios which are similar to the situation in which the error has been found. From the amended point set a set of line vectors can be produced and tested to ensure that the topology is free from errors once the amended line segment set has been produced. The amended line segment set may be one of a plurality of possible solutions to the erroneous line feature set, and once the amended line segment set has been validated in step 503, steps 501 and 502 can be re-performed iteratively to search for other possible solutions which solve the topological errors, based on alternative predefined assumptions which can produce an error free possible solution. When a correct or incorrect result is identified, this can be used to update the set of assumptions which are used to generate the line segment set which is presented to the user. Each option may be assigned a weighting coefficient. A range of options may be presented to the user.

In step 504, the user is presented with the new vector set(s) which provide the solution(s) to the topological errors in the data set. The user is presented with a graphical display of the solution which has the highest probability of being correct based on the current set of assumptions in step 505, and is presented with the option to reject the solution before a countdown timer expires at time t. If the user does not reject the solution, the change is applied to the topological dataset at time t in step 506. If the user does reject the proposed solution, the next most likely solution is presented, until no further automatically generated solutions remain. The user then has the opportunity to adjust the dataset manually, using a conventional system for editing geographic data.

Aspects described herein go beyond the implementation of a simple scheme since it requires a decomposition of the geometries of spatial features into line segments and the extension of database structures and detects errors in a topology using SQL queries to compare the sets of line segments. The inventive method also goes beyond the presentation of information since at least in some cases it clears the error in a fully automated manner and does thus not require cognitive analysis and decision making of a human operator. Hence, a broken technical chain argument cannot apply to the fully automated method.

Figure 6:
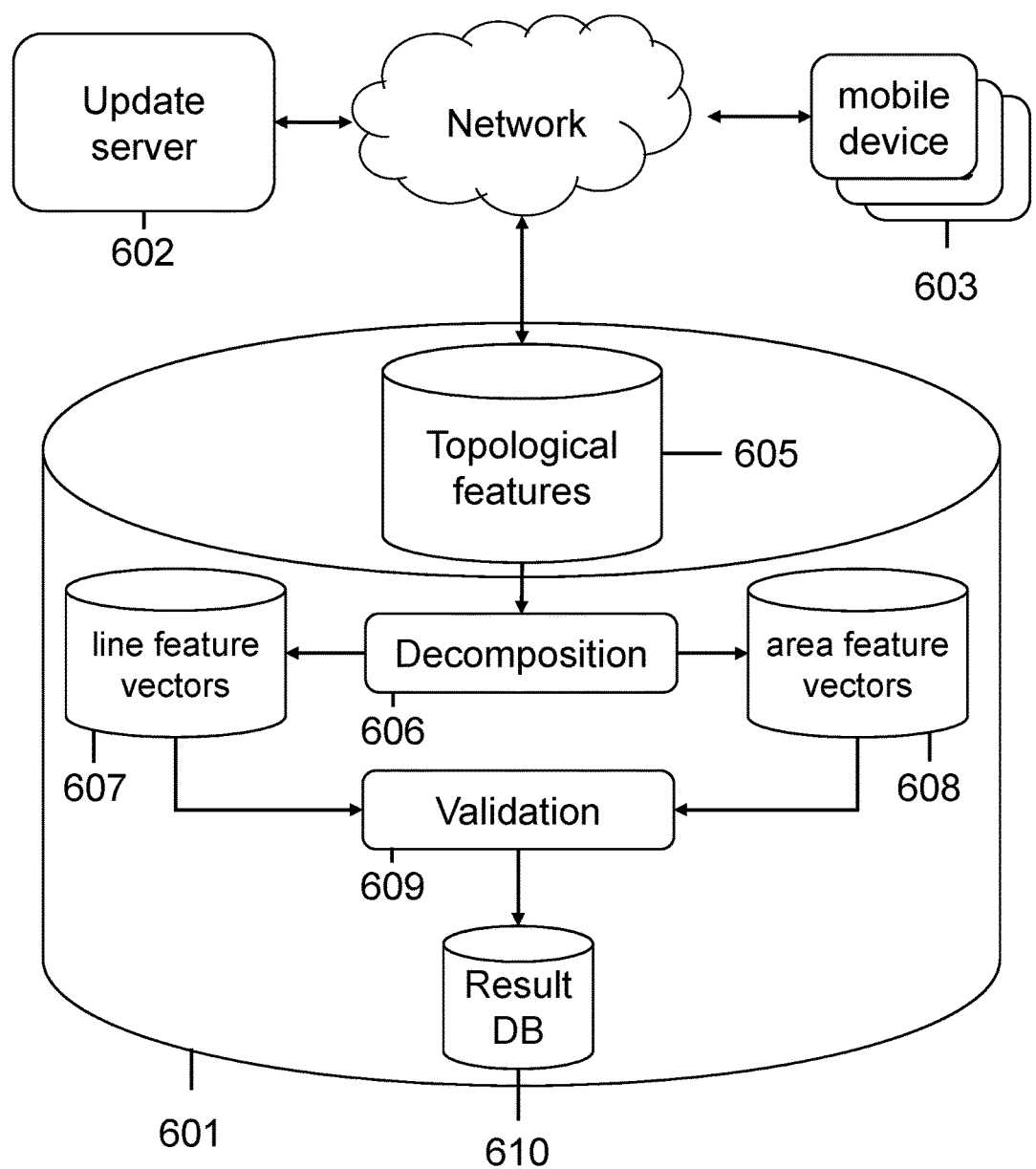
FIG. 6 shows a system architecture comprising a database server with extended database structures.

The inventive method is built upon a networked computer system shown in FIG. 6 that comprises a database server 601, and an update server 602, a plurality of mobile survey and/or update devices 603, a network connecting the mobile devices and the server(s) and a distributed database system.

The database server comprises a features dataset 605, which may be a full dataset, such as the OS Mastermap®, comprising hundreds of millions of topographical features. Database server 601 comprises a decomposition module 606. Decomposition module reads from the features dataset 605 and decomposes each of the features' geometries into line vectors. Database structures 607 and 608 are populated with the vectors representing the features. The system can be arranged such that database 607 comprises line vectors decomposed from line features and database 608 comprises the line vectors which are decomposed area features. A validation module 609 then validates the database structures for errors using the steps outlined above. Following the further steps outlined above, the result database 610 is populated with the topological errors present in the dataset. A user of the system may be presented with a graphical display of the results of the validation process outlined above on a user terminal (not shown).

The invention claimed is:

1. A computer implemented method comprising:
analyzing a spatial topology dataset comprising a plurality of topological features each having a geometry, wherein the spatial topology dataset is stored in computer readable media and is usable to output a digital map on a display device;
decomposing the geometries of the topological features within the spatial topology dataset into individual coordinate vectors;
populating a first index in a first database structure with the individual coordinate vectors;
performing validation queries on the first database structure in order to locate one or more topological errors in the dataset, wherein a validation query comprises determining whether a first coordinate vector for a first topological feature in the dataset corresponds to a second coordinate vector for a second topological feature in the dataset;
identifying the coordinate vectors which are edges of the spatial topology dataset, and where an edge vector is present in the data structure comprising the located topological errors;
removing the edge vector from said data structure after performing the validation queries; and
updating the spatial topology dataset to correct the one or more topological errors located based on the performed validation queries.

2. A computer implemented method according to claim 1, further comprising:
populating a further database structure with the located topological errors.

3. A computer implemented method according to claim 1, wherein
performing the validation queries includes performing a set difference query on the first database structure.

4. A computer implemented method according to claim 1, further comprising:
populating a second index in the first database structure with the individual coordinate vectors in inverted form, wherein the set difference query is performed on both the first index and the second index.

5. A computer implemented method according to claim 4, wherein the coordinate vectors are decomposed from one of: line features or area features.

6. A computer implemented method according to claim 1, wherein the first database structure is populated with individual line vectors from decomposed topological area features, and the method further comprises populating a second database structure with individual line vectors from decomposed topological line features,
wherein performing the validation queries further comprises comparing the contents of the first database structure with that of the second database structure to locate topological errors.

7. A method according to claim 1, further comprising:
dynamically updating the coordinate vectors and vector indices in the relevant data structure in response to an update of a collection of source features, and
dynamically performing the validation queries in response to the update of a collection of source features.

8. A method according to claim 1, further comprising the step of: automatically determining a clearance of the topological error for all entries in the further database structure by graphically displaying a modified arrangement of one or more line coordinate vectors that produced the topological error.

9. A method according to claim 8, further comprising displaying a countdown timer that automatically applies a solution to the topological data set after a pre-defined time interval.

10. A method according to claim 9, further comprising updating the database structures with new set of line vectors based on the applied solutions.

11. A method according to claim 8, wherein the modified arrangement of the one or more line coordinate vectors is created based on a predetermined rule set.

12. A method according to claim 11, wherein the predetermined rule set includes applying one or more weighting coefficients to one or more possible solutions to the topological error, and the best solution is graphically displayed.

13. A networked computer system comprising:
a database server;
one or more of a survey server, an update server, a plurality of mobile survey and/or update devices; and
a distributed database system,
wherein the system is arranged to perform a method for automatically validating a spatial topology dataset comprising a plurality of topological features each having a geometry by:
analyzing a spatial topology dataset comprising a plurality of topological features each having a geometry, wherein the spatial topology dataset is stored in computer readable media and is usable to output a digital map on a display device;
decomposing the geometries of the topological features within the spatial topology dataset into individual coordinate vectors;
populating a first index in a first database structure with the individual coordinate vectors;
performing validation queries on the first database structure in order to locate one or more topological errors in the dataset, wherein a validation query comprises determining whether a first coordinate vector for a first topological feature in the dataset corresponds to a second coordinate vector for a second topological feature in the dataset;
identifying the coordinate vectors which are edges of the spatial topology dataset, and where an edge vector is present in the data structure comprising the located topological errors;
removing the edge vector from said data structure after performing the validation queries; and
updating the spatial topology dataset to correct the one or more topological errors located based on the performed validation queries.

14. One or more non-transitory computer readable storage media comprising computer readable instructions that, when executed, cause a system to perform a method for automatically validating a spatial topology dataset comprising a plurality of topological features each having a geometry, by:
analyzing the spatial topology dataset, wherein the spatial topology dataset is stored in computer readable media and is usable to output a digital map on a display device;
decomposing the geometries of the topological features within the spatial topology dataset into individual coordinate vectors;
populating a first index in a first database structure with the individual coordinate vectors;
performing validation queries on the first database structure in order to locate one or more topological errors in the dataset, wherein a validation query comprises determining whether a first coordinate vector for a first topological feature in the dataset corresponds to a second coordinate vector for a second topological feature in the dataset;
identifying the coordinate vectors which are edges of the spatial topology dataset, and where an edge vector is present in the data structure comprising the located topological errors;
removing the edge vector from said data structure after performing the validation queries; and
updating the spatial topology dataset to correct the one or more topological errors located based on the performed validation queries.

15. The computer readable storage media of claim 14, wherein automatically validating a spatial topology dataset further comprises:
populating a further database structure with the located topological errors.

16. The computer readable storage media of claim 14, wherein performing the validation queries includes performing a set difference query on the first database structure.

17. The computer readable storage media of claim 14, wherein automatically validating a spatial topology dataset further comprises:
populating a second index in the first database structure with the individual coordinate vectors in inverted form,
wherein the set difference query is performed on both the first index and the second index.

18. The computer readable storage media of claim 17, wherein the coordinate vectors are decomposed from one of: line features or area features.

* * * * *